United States Patent [19]
Farris et al.

[11] Patent Number: 5,663,749
[45] Date of Patent: Sep. 2, 1997

[54] SINGLE-BUFFER DATA FORMATTER FOR SPATIAL LIGHT MODULATOR

[75] Inventors: Jeffrey S. Farris, Plano; Stephen G. Kalthoff, Frisco, both of Tex.

[73] Assignee: Texas Instruments Incorporated, Dallas, Tex.

[21] Appl. No.: 407,569

[22] Filed: Mar. 21, 1995

[51] Int. Cl.$^6$ .................................................. G09G 1/02
[52] U.S. Cl. ........................................... 345/190; 348/771
[58] Field of Search ................................ 345/84, 189, 190, 345/200; 395/425; 348/716, 718, 441, 771, 573, 743; 365/230.02, 189.02, 230.05

[56] References Cited

U.S. PATENT DOCUMENTS

| | | | |
|---|---|---|---|
| 4,983,958 | 1/1991 | Carrick et al. | 345/190 |
| 5,079,544 | 1/1992 | DeMond et al. | 340/701 |
| 5,255,100 | 10/1993 | Urbanus | 358/231 |
| 5,278,652 | 1/1994 | Urbanus et al. | 358/160 |
| 5,361,339 | 11/1994 | Kadakia et al. | 345/200 |
| 5,442,402 | 8/1995 | Sohn et al. | 348/716 |

*Primary Examiner*—Victor R. Kostak
*Attorney, Agent, or Firm*—Julie L. Reed; James C. Kesterson; Richard L. Donaldson

[57] ABSTRACT

A formatter (13) for formatting data for use by a spatial light modulator (15) in an image display system (10). The formatter (13) converts data from pixel format to bit-plane format. The formatter (13) has a square array of memory cells (41), which are connected so that they can shift data either across the array from column to column (vertically) or down the array from row to row (horizontally). The loading of data to the array is toggled between vertical and horizontal loading (FIGS. 6A–6D). While the array is loaded vertically from one side, data is shifted out of the array at the other side. While the array is loaded horizontally from the top, data is shifted out at the bottom. Because of the orthogonal input versus output, the output data is arranged by bit-weight rather than by pixel.

11 Claims, 3 Drawing Sheets

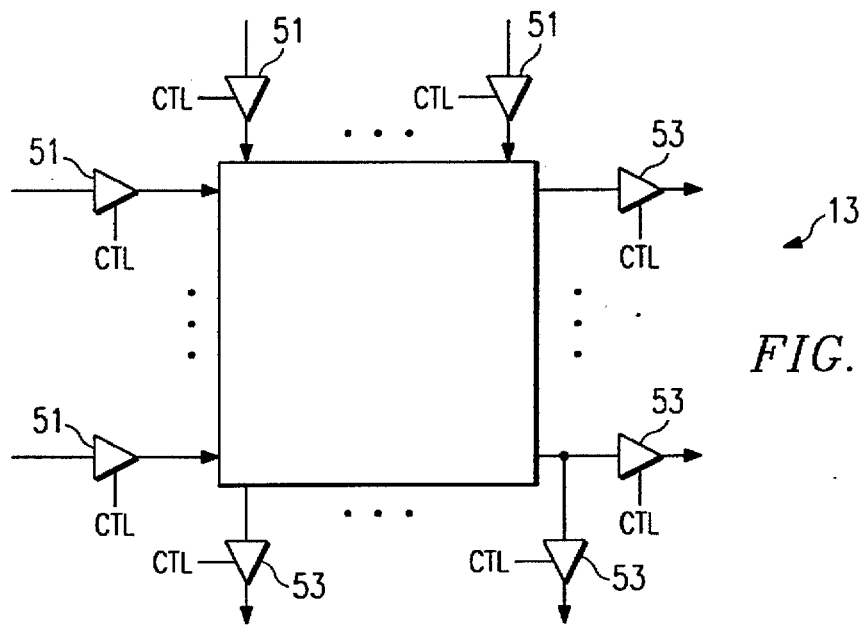
FIG. 5
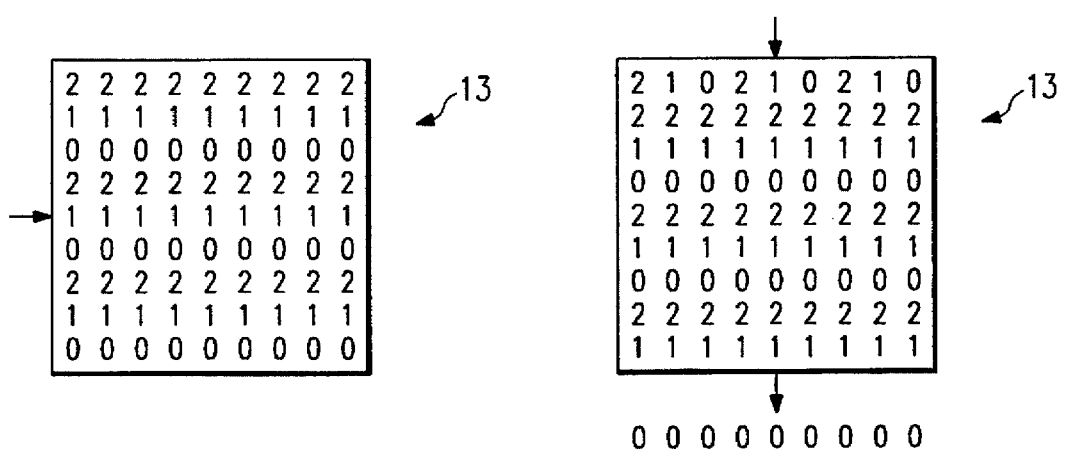
FIG. 6A
FIG. 6B
FIG. 6C
FIG. 6D

SINGLE-BUFFER DATA FORMATTER FOR SPATIAL LIGHT MODULATOR

TECHNICAL FIELD OF THE INVENTION

This invention relates to spatial light modulators (SLMs), and more particularly to a formatter that converts image data from pixel format to bit-plane format for delivery to the SLM.

BACKGROUND OF THE INVENTION

Image display systems based on spatial light modulators (SLMs) are increasingly being used as an alternative to image display systems based on cathode ray tubes. As used for image display applications, SLMs are arrays of pixel-generating elements that emit or reflect light to an image plane. The pixel-generating elements are often themselves referred to as "pixels", as distinguished from pixels of the image. This terminology is clear from context, so long as it is understood that more than one pixel of the SLM array can be used to generate a pixel of the image.

The pixels of the SLM are individually addressable, such that the image is defined by which pixels are on or off at a given time. Moving images can be generated by re-addressing the SLM with data for successive frames. Greyscale images can be created with various modulation schemes, and color images can be created by filtering the emitted or reflected light.

For addressing the pixels of the SLM, each pixel is in communication with a memory cell that stores a bit of data that determines the on or off state of an address signal. The addressing is binary in the sense that each pixel is addressed with a high or low signal that indicates whether or not the pixel is to emit or reflect light to the image plane. The SLM is "loaded" by storing data in the memory cells, via a data loading circuit peripheral to the SLM's array of pixels.

The memory cells of the SLM are loaded with data that has a special "bit-plane" format. This format permits greyscale images to be generated by addressing each pixel with successive address signals during a frame period, each address signal representing a different bit weight of that pixel's n-bit pixel value. For example, for 8-bit pixel values (256 levels of intensity), each pixel is represented with eight bits of data, and addressed eight times during a frame. Each time the pixel is addressed, the bit value determines whether the pixel is on or off and the bit weight determines how long the mirror remains on or off. The human eye integrates light from the on and off times and sees a greyscale image.

Various schemes for converting data from pixel format to bit-plane format for SLMs are described in U.S. Pat. No. 5,255,100, entitled "Data Formatting with Orthogonal Input/Output and Spatial Reordering", and in U.S. Pat. No. 5,278,652, entitled "DMD Architecture and Timing for Use in a Pulse Width Modulated Display System". In the past, such formatting schemes have required some form of double buffering to maintain a continuous stream of data. Data in pixel format is written into one array of memory cells while bit-plane data is read from a second array.

SUMMARY OF THE INVENTION

One aspect of the invention is a pixel data formatter for a spatial light modulator having individually addressable pixels for generating images based on the pixel data. The formatter has a square array of memory cells, each memory cell storing a bit of pixel data. Typically, the size of the array is n by n for n pixels of n-bit values. A vertical input line and a horizontal input line are connected to an input of each memory cell. A multiplexer at the input of each memory cell determines whether input bits are written to the memory cell from the vertical input line or from the horizontal input line. A vertical output line and a horizontal output line are connected to an output of each memory cell. A multiplexer at the output of each memory cell for determining whether output bits are read from the memory cell to the vertical output line or to the horizontal output line. Because of the orthogonal input versus output, the output data is arranged by bit-weight rather than by pixel. Because the output can be toggled between inputs and outputs, output data can be provided continuously.

An advantage of the invention is that it performs bit-plane formatting with half the memory hardware required for previous formatters. The cost of the formatter is reduced, without loss of data throughput. Also, the size of the formatter is reduced, which leads to more compact display systems.

BRIEF DESCRIPTION OF THE DRAWINGS

FIG. 5 illustrates an alternative method of toggling between outputs of the formatter.

FIGS. 6A–6D illustrate how the formatter is used to convert pixel data to bit-plane data.

DETAILED DESCRIPTION OF THE INVENTION

Figure 1:
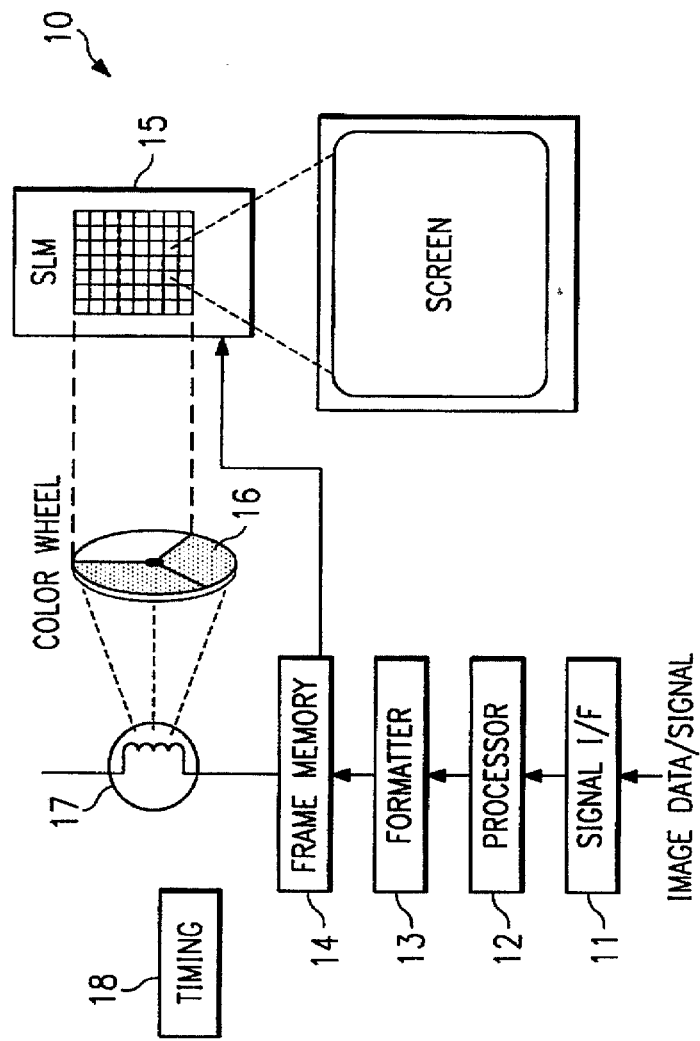
FIG. 1 is a block diagram of an SLM-based image display system having a formatter in accordance with the invention.

FIG. 1 is a block diagram of an SLM-based image display system 10. As explained below, the invention is directed to formatter 13, which converts image data from pixel format to bit-plane format, so that the pixels of the SLM 15 can be simultaneously addressed by bit values of the same bit weight.

For purposes of example, the SLM 15 of FIG. 1 is a DMD (digital micro-mirror device), whose structure and operation is explained below. However, formatter 13 could be used in a display system 10 having some other type of SLM 15, such as an array of liquid crystal elements, so long as the SLM uses a similar addressing technique. Also, formatter 13 might be used in a simpler display system than that of FIG. 1, such as one that receives pre-processor pixel data and does not require an interface 11 and processor 12.

The following overview of the various components of display system 10 provides details helpful to understanding of the invention. Further details pertaining to DMD-based image display systems, but without the formatting of the present invention, are set out in U.S. Pat. No. 5,079,544, entitled "Standard Independent Digitized Video System"; in U.S. patent Ser. No. 08/147,249 entitled "Digital Television System"; and in U.S. patent Ser. No. 08/146,385, entitled "DMD Display System". Each of these patents and patent applications is assigned to Texas Instruments Incorporated, and each is incorporated by reference herein.

Signal interface 11 receives some kind of input signal. For purposes of example herein, it will be assumed that the input signal is a standard analog video signal having horizontal and vertical synchronization components. However, in other systems, the input signal might be graphics data already in digital form.

In the case of a video input signal, interface 11 separates the video signal from synchronization and audio signals. It includes an A/D converter and a Y/C separator, which convert the data into pixel data samples and separate the luminance data from the chrominance data. The signal could be converted to digital data before Y/C conversion or Y/C separation could occur before digitization.

Processor 12 prepares the data for display, by performing various processing tasks. Processor 12 includes processing memory for storing pixel data during processing. The tasks performed by processor 12 may include linearization, colorspace conversion, and line generation. Linearization removes the effect of gamma correction, which is performed on broadcast signals to compensate for the non-linear operation of CRT displays. Colorspace conversion converts the data to RGB data. Line generation can be used to convert interlaced fields of data into complete frames by generating new data to fill in odd or even lines. The order in which these tasks are performed may vary.

The image data output from processor 12 is RGB data. For purposes of simplicity in this description, this image data is assumed to be 9-bit data, with 3 bits for each color. Typically, however, pixel data will have larger bit values for greater variation in intensity. A "frame" of data is the set of pixel values (m rows×n columns) that are used to address the SLM array during one frame period.

The 9-bit pixel data is delivered in parallel to formatter 13. The data is in "pixel format", which means that it is primarily ordered by bits of the same pixel. Typically, the ordering is by pixel, row, frame. For a sequential color system, having a color wheel 16, each frame has its pixel data arranged by color. As explained below in connection with FIGS. 4, 5, and 6A–6D, formatter 13 converts the pixel data to bit-plane format. Many variations on the ordering of the data input to formatter 13, beyond the pixel-by-pixel ordering of "pixel format", are possible, and are unimportant to operation of the formatter 13. One variation is the "split-reset" ordering, explained below in connection with FIG. 3. Also, for some SLMs 15, it may be desirable to order the bit-plane data for every nth pixel of a row, then every nth+1, then every nth+2, etc, for that row. Regardless of these variations, the pixel-to-pixel ordering of pixel format is converted to bit-by-bit ordering of bit-plane format.

Figure 2:
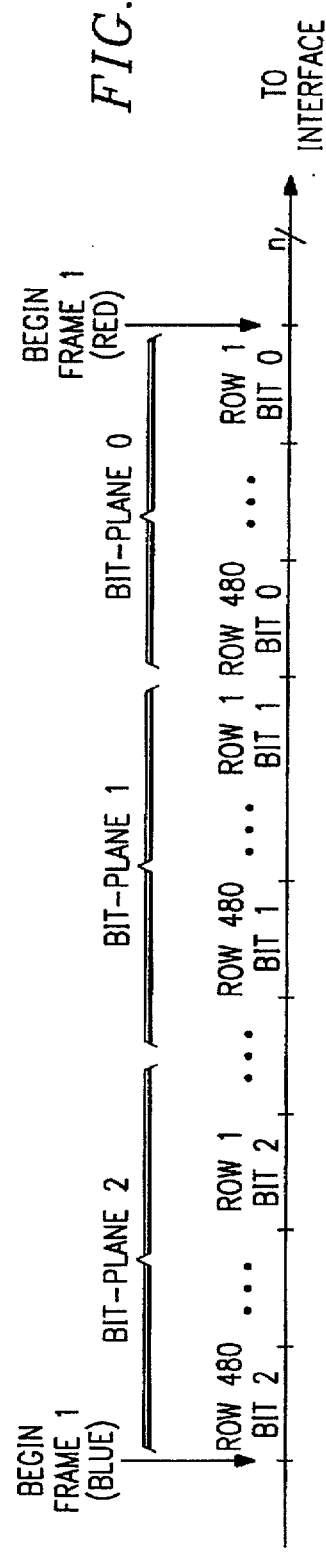
FIG. 2 illustrates data in bit-plane format, after being formatted by the formatter of FIG. 1.

FIG. 2 illustrates data in bit-plane format, after being formatted by formatter 13. As illustrated, each frame of data is ordered according to the bit-weights of the pixel values. For example, for a frame of 480 by 640 pixels, each pixel having 9 bits, there would be 9 bit-planes each having 480 by 640 bits. The bit-planes are ordered by color, with the 3 bits for a first color, e.g., red, being first in order, then the 3 bits for another color, e.g., blue, etc. For each color, the bit-planes containing less significant bits will result in shorter display times than bit-planes containing more significant bits.

In FIG. 2, within each color, the bit-planes are consecutively ordered from bit-plane 0 to bit-plane 2. Also, within each bit-plane, the rows are consecutively ordered from row 1 to row 480. As stated above, however, variations from these orderings are possible, but regardless of the ordering of the input data, the re-ordering converts n consecutive pixels of n-bit data to n bit-planes for those n pixels.

Figure 3:
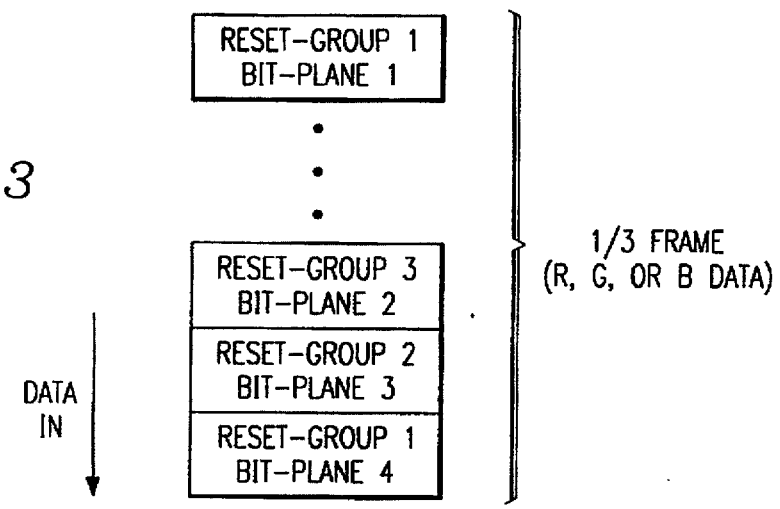
FIG. 3 illustrates data in bit-plane format, further formatted for memory multiplexed addressing.

FIG. 3 illustrates the bit-plane format output by formatter 13, which received the pixel data already arranged for a memory-multiplexed SLM 15. The bit-plane format is similar to that of FIG. 2 except that the rows of each bit-plane are not consecutive, but rather the bit-planes are formatted by dividing them into groups of rows, called "reset groups". These reset groups are interspersed with respect to bit-weight for implementing a "memory multiplexed" SLM 15. In other words, the reset-groups within a frame are not necessarily ordered by bit-weight. In general, memory multiplexing is a means of using a single memory cell to store data for multiple pixel-generating elements of the SLM 15. Details describing memory multiplexing are set out in U.S. patent Ser. No. 08/300,356, entitled "Pixel Control Circuitry for spatial Light Modulator," assigned to Texas Instruments Incorporated and incorporated by reference herein. As stated above, each pixel of SLM 15 is addressed by means of data stored in an associated memory cell. In a memory multiplexed system, a group of pixels share a memory cell. The memory cell receives its data via bit-lines from the SLM's loading circuitry. It delivers a signal representing this data to each of its associated pixels, which are actuated or not according to a reset signal. For any active reset signal to the SLM, one of the pixels associated with a memory cell is reset.

Typically, for a memory multiplexed SLM 15, the division of a frame of data into reset groups will be performed after the data is in bit-plane format, by addressing memory 14 for the desired bit-plane rows. However, it is also possible that pixel data might be formatted into reset-groups before being converted to bit-planes.

In general, by "bit-plane format" is meant a format in which data is primarily ordered by bits of the same bit-weight. The next level of ordering may be by alternating pixels, or by row, as discussed above.

Referring again to FIG. 1, the bit-plane data is delivered to frame memory 14. In a typical display system 10, frame memory 14 is a double-buffer memory, which means that it has a capacity for at least two display frames. The buffer for one display frame can be read out to SLM 15 while the buffer or another display frame is being written. The two buffers are controlled in a "ping-pong" manner so that data is continuously available to SLM 15.

SLM 15 may be any type of SLM. For purposes of example, this description is in terms of a display system whose SLM is a digital micro-mirror device (DMD). However, as stated above, the same concepts apply to display systems that use other types of SLMs.

Light incident on SLM 15 is provided by a white light source 17 and is transmitted through a rotating color wheel 16. In the system of FIG. 1, SLM 15 is a reflective SLM (a DMD), and the color wheel 16 is used to filter the light before reflection. As an alternative, the color wheel 16 could be placed so that light is filtered after being emitted or reflected. The data for each color are sequenced and the display of the data is synchronized so that the portion of color wheel 16 through which light is being transmitted to SLM 15 corresponds to the data being displayed. In the example of this description, each pixel is represented by an RGB data value, which means that each pixel has a red value, a green value, and a blue value. As the values for each color of all pixels in a frame are being displayed, color wheel 16 rotates so that the light is transmitted through the corresponding red, blue or green filter. For each pixel, the combination of these three values is perceived as the desired color.

Color wheel 16 includes a motor, controlled by a motor controller that controls the speed and phase of color wheel 16. For example, the desired speed might be 60 revolutions per second to correspond to a 60 frame per second display rate. The phase is set so that the proper filter (red, green, or blue) of color wheel 16 is transmitting light from SLM 15 as the data for that filter is being displayed. To maintain a correct phase relationship between the color wheel 16 and the data being displayed, the color wheel 16 can speed up or slow down or the data can be delayed or skipped.

Master timing unit 18 provides various system control functions. One timing signal provided by master timing unit 18 is a signal defining the display times for each bit weight of the pixel value. For a DMD-based system, the data delivered to SLM 15 is in a bit-plane format for pulse width modulation. Each red, green, and blue value of a pixel has n bits per frame. A pixel value of 0 (black) results in the pixel being off for that color during the frame. For each color, each mirror element of the SLM 15 can be "on" for a duration of anywhere from 1 LSB period to 2n−1 LSB periods. In other words, each color has 2n−1 time slices, during which any pixel can be on for any number of time slices between 0 and 2n−1.

Figure 4:
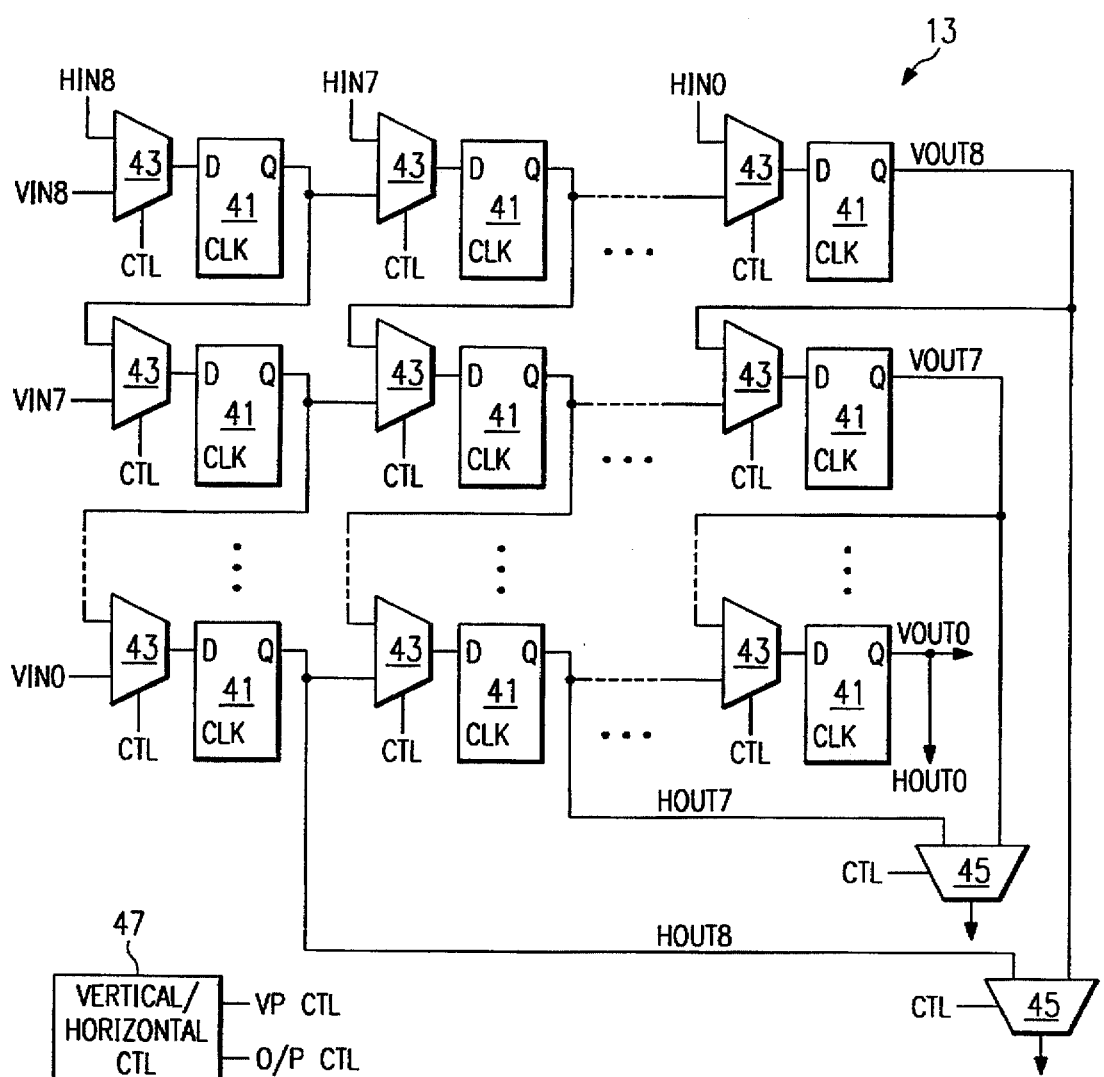
FIG. 4 illustrates a formatter in accordance with the invention.

FIG. 4 illustrates a formatter 13 that converts image data from pixel format to bit-plane format in accordance with the invention. The data output from formatter 13 is ordered by bit-weight, either in contiguous bit-planes as in FIG. 2 or in parts of a bit-plane as in FIG. 3.

Formatter 13 is essentially comprised of a square array of memory cells 41, each memory cell 41 having a 2:1 multiplexer 43 at its input. In the example of FIG. 4, memory cells 41 are DQ flip-flops.

The size of the array of memory cells 41 corresponds to the number of bit values for one pixel. Thus, as stated above, where there are 3 bits for each of three colors (9 bits per pixel), the array size is 9 by 9.

Pixel data enters memory cells 41 in parallel, the 9 bits of one pixel at a time. This 9-bit data may enter the array of memory cells 41 either vertically at the first column on the left side or horizontally at the first row on the top. The array of memory cells 41 is loaded vertically (column by column) or horizontally (row by row), in alternating sequences of 9 pixels at a time.

In the case of vertical loading, the data is loaded via vertical input lines, VIN0–VIN8, connected to the first column of the array of memory cells 41. After the first column is loaded with data for one pixel, that data shifts to the second column and the first column is loaded with the data for a next pixel. This continues for 9 pixels, so that all memory cells 41 are vertically loaded. During the vertical loading, any data that has already been loaded is shifted out of the array of memory cells 41 via vertical output lines, VOUT0–VOUT8, which are connected to a last column of the array.

In the case of horizontal loading, the data is loaded via horizontal input lines, HIN0–HIN8, connected to a first row of the array of memory cells 41. After the first row is loaded with data for one pixel, the data shifts to the second row and the first row is loaded with the data for a next pixel. This continues for 9 pixels, so that all memory cells 41 are horizontally loaded. During the horizontal loading, any data that has already been loaded is shifted out of the array of memory cells 41 via horizontal output lines, HOUT0–HOUT8, which are connected to a last row of the array.

The memory cell array is "toggled" between vertical and horizontal loading every 9 pixels. The data to be loaded to each memory cell 41 is from one of two input lines. The first input line is from either the memory cell 41 to the left or is one of the vertical input lines, depending on the cell's position in the array. The second input line is from either the memory cell 41 above or is one of the horizontal input lines, depending on the cell's position in the array.

In FIG. 4, toggling between inputs is accomplished with a multiplexer 43 at the input to each memory cell 41. The multiplexers 43 are reset every 9 pixels so as to select either horizontal or vertical inputs. The multiplexers 43 share a common shift direction control input, CTL.

Likewise, the outputs from that array of memory cells 41 is toggled between vertical and horizontal outputs every 9 pixels. In FIG. 4, this is accomplished with multiplexers 45. These multiplexers 45 receive a pair of corresponding vertical and horizontal outputs, and are reset every 9 pixels to select between them. Multiplexers 45 share a common shift direction control signal input, CTL.

A control unit 47 provides control signals for toggling between horizontal and vertical inputs and between horizontal and vertical outputs. In the case of multiplexed inputs and outputs, the control signals are provided to multiplexers 45 and 47.

FIG. 5 illustrates an alternative method of toggling between inputs or outputs. In FIG. 5, each input line has a tristate driver 51, which is in a high impedance state when it is not being used to deliver data to memory cells 41 of array 13. Drivers 51 on the horizontal input lines share the same input direction control signal, as do the drivers 51 on the vertical input lines. Likewise, each output line has a tristate driver 53, which is in a high impedance state when it is not being used to receive data. Drivers 53 on the horizontal output lines share the same output direction control signal, as do the drivers 53 on the vertical output lines. Drivers 51 on the input lines and drivers 53 on the output lines are referred to herein as "wired multiplexers".

FIGS. 6A–6D illustrate how formatter 13 is used to format pixel data in accordance with the invention. Again, for simplicity, formatter 13 is a 9 by 9 array, for re-formatting 9-bit pixel data. Each pixel has 3 bits, bits 0–2, for three colors.

In FIG. 6A, formatter 13 has been vertically loaded with data for 9 pixels. The data has been loaded in parallel via 9 vertical input lines (shown in FIG. 4) connected to a first column of formatter 13. As the 9-bits for each new pixel are loaded, the data already loaded shifts across the array from column to column of memory cells 41. When 9 pixels are loaded, that vertical loading sequence ends, and a horizontal loading sequence begins.

In FIG. 6B, formatter 13 is being horizontally loaded with data for another 9 pixels. The data is being loaded in parallel via 9 horizontal input lines (shown in FIG. 4) connected to a first row of formatter 13. As the 9 bits for each new pixel are loaded, the data already loaded shifts down from row to row of the array. Also, the data in the last row is shifted out of the array via 9 horizontal output lines (shown in FIG. 4). As illustrated, the 9 bits for one pixel have been loaded into the first row. The data already stored in the memory cells 41 is the vertically loaded data from FIG. 6A. The data being output is the bit 0 data for a first color for each of 9 pixels.

In FIG. 6C, the horizontal loading is complete for 9 pixels. The data that has been shifted out of the last row is the bit 2 data for a third color for each of 9 pixels.

In FIG. 6D, formatter 13 is again being vertically loaded with data for another 9 pixels. Now, the data for the previous 9 pixels, which was horizontally loaded, is being shifted out of the last column of memory cells. As illustrated, the 9 bits for one pixel has been loaded into the first column. The data being output is the bit 0 data for a first color of each of 9 pixels.

The method described in FIGS. 6A–6D is performed at the pixel clock rate, such that one pixel is loaded to formatter 13 during every pixel clock. In other words, all pixels for one frame are loaded to, and output from, formatter 13 during one frame period. The "frame period" is the display time for a frame of data. For a real time display rate of 60 frames per second, the frame period is approximately 16.7 milliseconds.

Other Embodiments

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A data formatter for a spatial light modulator having individually addressable pixels for generating images based on pixel data, comprising:

a square array of memory cells, each memory cell for storing a bit of pixel data, wherein said square array has a size corresponding to a data size of n pixels each having an n-bit value;

a vertical input line and a horizontal input line connected to an input of each memory cell;

a multiplexer at said input of each memory cell for determining whether said bit shall be written to said memory cell from said vertical input line or from said horizontal input line;

a vertical output line and a horizontal output line connected to an output of each memory cell; and a multiplexer at said output of each memory cell for determining whether said bit shall be read from said memory cell to said vertical output line or to said horizontal output line.

2. The data formatter of claim 1, wherein said memory cells are flip flops.

3. The data formatter of claim 1, wherein said square array has a size corresponding to a data size of n pixels each having an n-bit value.

4. A method of converting data from pixel format to bit-plane format, comprising the steps of:

vertically loading a square array of memory cells with data, via vertical input lines connected to a first column of said memory cells, said loading being accomplished by shifting said data column by column into said square array;

outputting columns of data via vertical output lines connected to a last column of said memory cells, during said vertically loading step;

horizontally loading said square array of memory cells with data, via horizontal input lines connected to a first row of said memory cells, said loading being accomplished by shifting said data row by row down said array;

outputting rows of data from a last row of said memory cells, during said horizontally loading step; and alternating between said vertically loading step and said horizontally loading step.

5. The method of claim 4, wherein said loading steps are performed by loading n pixels having n-bit values.

6. The method of claim 4, wherein said loading steps are performed by switching between said vertical input lines and said horizontal input lines.

7. The method of claim 4, wherein said switching is performed with multiplexers on a pair of input lines associated with each memory cell.

8. The method of claim 4, wherein said switching is performed with a tristate driver on each input line.

9. The method of claim 4, wherein said outputting step is performed by switching between said vertical output lines and said horizontal output lines.

10. The method of claim 4, wherein said switching is performed with multiplexers on a pair of output lines associated with each memory cell.

11. The method of claim 4, wherein said switching is performed with a tristate driver on each output line.

* * * * *